O. H. JOBSKI.
RIM.
APPLICATION FILED JULY 14, 1919.
1,407,545.
Patented Feb. 21, 1922.
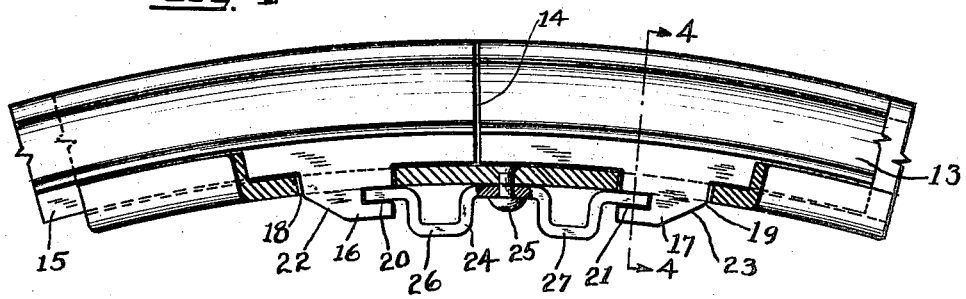
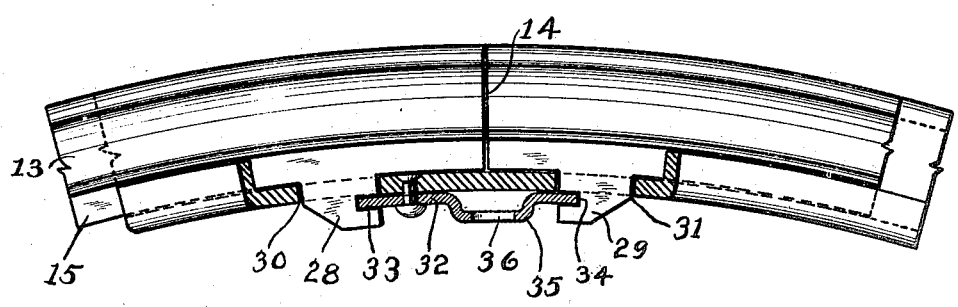
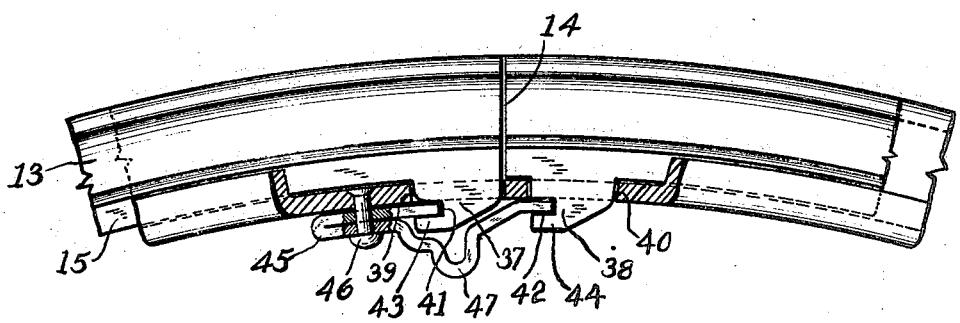
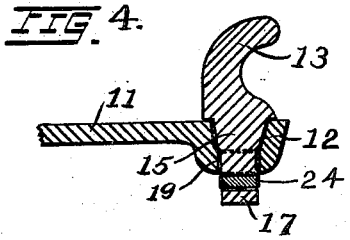
Inventor
OTTO. H. JOBSKI.
by B. McKent
Attorney

UNITED STATES PATENT OFFICE.

OTTO H. JOBSKI, OF CLEVELAND, OHIO, ASSIGNOR TO THE STANDARD PARTS COMPANY, OF CLEVELAND, OHIO, A CORPORATION OF OHIO.

RIM.

1,407,545.   Specification of Letters Patent.   Patented Feb. 21, 1922.

Application filed July 14, 1919. Serial No. 310,792.

*To all whom it may concern:*

Be it known that I, OTTO H. JOBSKI, a citizen of the United States, and a resident of Cleveland, county of Cuyahoga, State of Ohio, have invented certain new and useful Improvements in Rims, of which the following is a specification.

This invention relates to vehicle wheel rims and more particularly to rims of the so-called quick detachable type in which the rim is provided with a split side ring at one edge thereof and detachable therefrom so as to facilitate the removal or replacing of a resilient tire upon the rim.

One of the objects of the invention is to provide simple and effective means for locking a detachable side ring upon the rim.

Other objects of the invention and the features of novelty will be apparent from the following description, taken in connection with the accompanying drawing, in which:—

Figure 1 is a fragmentary side elevation of a vehicle wheel rim embodying my invention, a part of the rim being broken away to more clearly disclose the structure;

Figs. 2 and 3 are fragmentary side elevations, similar to Fig. 1, but showing slightly modified structures embodying my invention; and Fig. 4 is a fragmentary cross-section on the line 4—4 of Fig. 1.

In the drawings, 11 indicates a vehicle wheel rim adapted to carry a resilient tire thereon, the body of the rim being depressed at one edge thereof to form a channel or groove 12 to receive a side ring 13 which is transversely split, as shown at 14, and is adapted to be expanded sufficiently to enable the radially inwardly extending web or base 15 thereon to be seated in the channel 12. Adjacent each end of the rim 11, transversely slotted lugs are provided which extend radially inwardly from the web or base 15 of the ring through apertures in the rim, and a latch member is pivotally attached to the body of the rim and adapted to be swung so that the ends will be disposed in the slots in the lugs to lock the ring in seated position.

In the modification shown in Fig. 1, the lugs 16 and 17, which extend radially inwardly through apertures 18 and 19 in the rim, are transversely slotted at 20 and 21, respectively, and their rear faces remote from the split 14 are preferably beveled inwardly and toward the end of the of the ring, as shown at 22 and 23. When the ring is mounted upon the rim, if the ring is not sufficiently contracted to permit the lugs to seat properly in their apertures, by reason of the engagement of the beveled face 22 or 23 with the rim at the edge of the aperture, radially inward pressure on the end of the ring will cause the lug to ride inwardly into its aperture, thereby effecting complete contraction of the ring. The latch 24 is pivotally mounted on the rim by a rivet 25, or other suitable means, in such manner that the ends thereof will engage in the slots 20 and 21 to hold the lugs and the locking ring in seated position. The latch 24 may be conveniently formed of stock metal of uniform thickness, the body of the latch being deflected away from the rim between its pivot and its ends to form projections 26 and 27 which may be engaged by a hammer or screw driver, to facilitate movement of the latch to and from locking position.

In the modification shown in Fig. 2, the lugs 28 and 29 are identical in shape with those shown in Fig. 1 and extend through apertures 30 and 31 in the rim and are locked in place therein by a latch 32, the ends of which, in one position of the latch, are disposed in the transversely extending slots 33 and 34 in the adjacent faces of the lugs. The latch 32 is similar to the latch 24 shown in Fig. 1 but is pivoted to the rim 11 adjacent one of its ends, and only one arm of the lever is provided with the deflected portion 35 to facilitate manipulation of the latch. An opening 36 may be formed in the radially deflected portion to permit the insertion of a screw driver or other implement therein to further facilitate motion of the latch.

In the modification shown in Fig. 3, the lugs 37 and 38 on the web 15 of the locking ring 13 are formed similar in outline to the lugs shown in the modification illustrated in Figs. 1 and 2, and extend through openings 39 and 40 in the rim and are adapted to be locked therein. The rear face of the lug 37 is slotted as shown at 41 and the forward face of the lug 38 is slotted as shown at 42, to provide toes 43 and 44, respectively, on the lugs 37 and 38, which extend in the same circumferential direction. A latch 45 is pivotally supported on the rim by a rivet 46, or other suitable means, and is adapted to interlock with the toes 43 and 44 of the lugs 37 and 38, respectively, to hold the lugs and the side ring in seated position. The latch 45 may be conveniently made of stock metal of uniform thickness bent upon itself as shown in the drawings, the rivet 46 passing through the doubled portion of the latch and the ends of the latch being disposed to enter the slots 41 and 42 in the lugs. The body of the longer arm of the latch is deflected as shown at 47 to form an enlarged surface for engagement by a hammer or other manipulating means.

When it is desired to replace the side ring 13 upon the rim, the lug at one end of the side ring is seated in its aperture and the ring is progressively seated around the circumference of the rim. When the other end of the ring is properly seated with its lug extending through its aperture, the latch 24, 32 or 45 is swung to engage the ends thereof in the slots in the lugs. In the structure shown in Fig. 3, it is preferable to first seat the lug 37 in its aperture 39 and then progressively seat the ring until the lug 38 registers with its aperture 40, the beveled rear face of the lug 38 facilitating the entry of the lug in its aperture.

Having thus described my invention, what I claim is:

1. The combination of a tire-carrying rim having a circumferential groove therein, a split side ring having a part thereof seated in said groove and having lugs thereon extending through said rim, and a lever pivoted to said rim, the ends of said lever, in one position thereof, interlocking with said lugs to hold said ring in seated position, and the pivot of said lever and one of said lugs being spaced sufficiently to permit the application of operating means therebetween.

2. The combination of a tire-carrying rim having a circumferential groove therein, a split side ring having a part thereof seated in said groove and having lugs thereon extending through said rim, and a latch cooperating with said rim and said lugs to lock said ring in seated position, said latch being of substantially uniform thickness throughout and a portion thereof being deflected to form a projection for engagement by an operating tool.

3. The combination of a tire-carrying rim having a circumferential groove therein, a transversely split side ring having a part thereof seated in said groove, and having lugs thereon adjacent its ends extending through said rim, said lugs having toes projecting therefrom in the same direction circumferentially, and means carried by said rim and interlocking with said lugs to hold said ring in seated position.

4. The combination of a tire-carrying rim having a circumferential groove therein, a transversely split side ring having a part thereof seated in said groove, and having lugs thereon adjacent its ends extending through said rim, said lugs having toes projecting therefrom in the same direction circumferentially, and a lever pivoted to said rim and comprising arms extending in the same drection from its pivot, the ends of said lever interlocking with said lugs to hold said ring in seated postion.

In testimony whereof I affix my signature.

OTTO H. JOBSKI.